(12) United States Patent
Muramatsu et al.

(10) Patent No.: US 7,564,199 B2
(45) Date of Patent: Jul. 21, 2009

(54) DISCHARGE LAMP LIGHTING CIRCUIT

(75) Inventors: Takao Muramatsu, Shizuoka (JP); Tomoyuki Ichikawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/852,460

(22) Filed: Sep. 10, 2007

(65) Prior Publication Data

US 2008/0061707 A1 Mar. 13, 2008

(30) Foreign Application Priority Data

Sep. 11, 2006 (JP) ............................. 2006-245793

(51) Int. Cl.
*G05F 1/00* (2006.01)
(52) U.S. Cl. .................. 315/308; 315/291; 315/307
(58) Field of Classification Search ................. 315/177, 315/209 R, 219, 220, 223, 224, 246, 256, 315/257, 258, 259, 276, 279, 282, 283, 291, 315/307, 326, 360, 362
See application file for complete search history.

(56) References Cited

U.S. PATENT DOCUMENTS 7,005,808 B2 * 2/2006 Ohta et al. ................... 315/226
7,084,585 B2 * 8/2006 Yamamoto et al. .......... 315/291

FOREIGN PATENT DOCUMENTS

JP 2001-06894 1/2001

* cited by examiner

*Primary Examiner*—Douglas W Owens
*Assistant Examiner*—Jianzi Chen
(74) *Attorney, Agent, or Firm*—Fish & Richardson P.C.

(57) ABSTRACT

A discharge lamp lighting circuit includes a power supplying portion having a series resonant circuit including transistors and a bridge driver, a starting portion for applying a high voltage pulse to a discharge lamp to promote a lighting operation, a lighting confirming portion for generating a lighting confirmation signal Sf indicating that a lighting operation for the discharge lamp fails or is successful by the high voltage pulse, and a control portion for generating a control signal Sc to control a driving frequency of the bridge driver. The lighting confirming portion generates a lighting confirmation signal Sf based on a relationship of the magnitude between a lamp voltage equivalent signal VS and a predetermined voltage $V_4$ at a time that a predetermined time $\Delta t$ passes since the application of the high voltage pulse to the discharge lamp.

7 Claims, 11 Drawing Sheets

FIG. 8 (a) VL 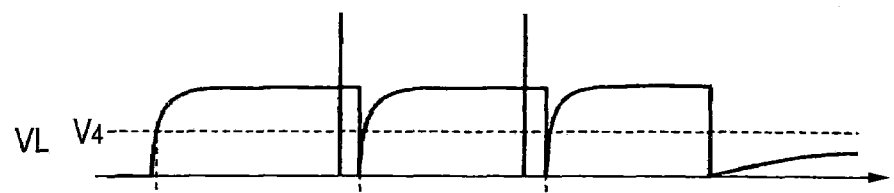
FIG. 8 (b) Vcd 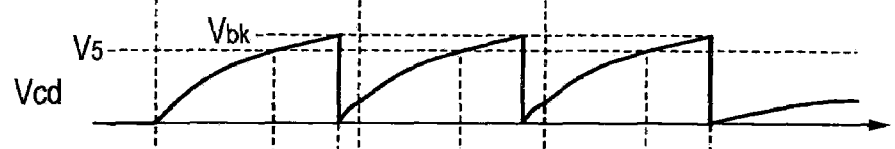
FIG. 8 (c) Sp1 
FIG. 8 (d) Q 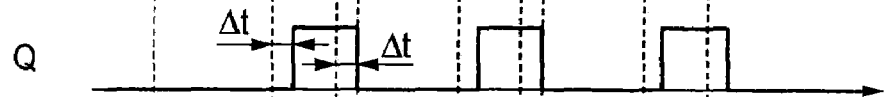
FIG. 8 (e) V7 
FIG. 8 (f) Sp2 
FIG. 8 (g) S4 
FIG. 8 (h) Sf 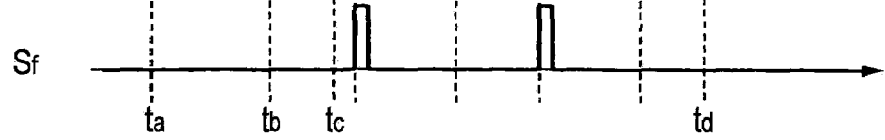

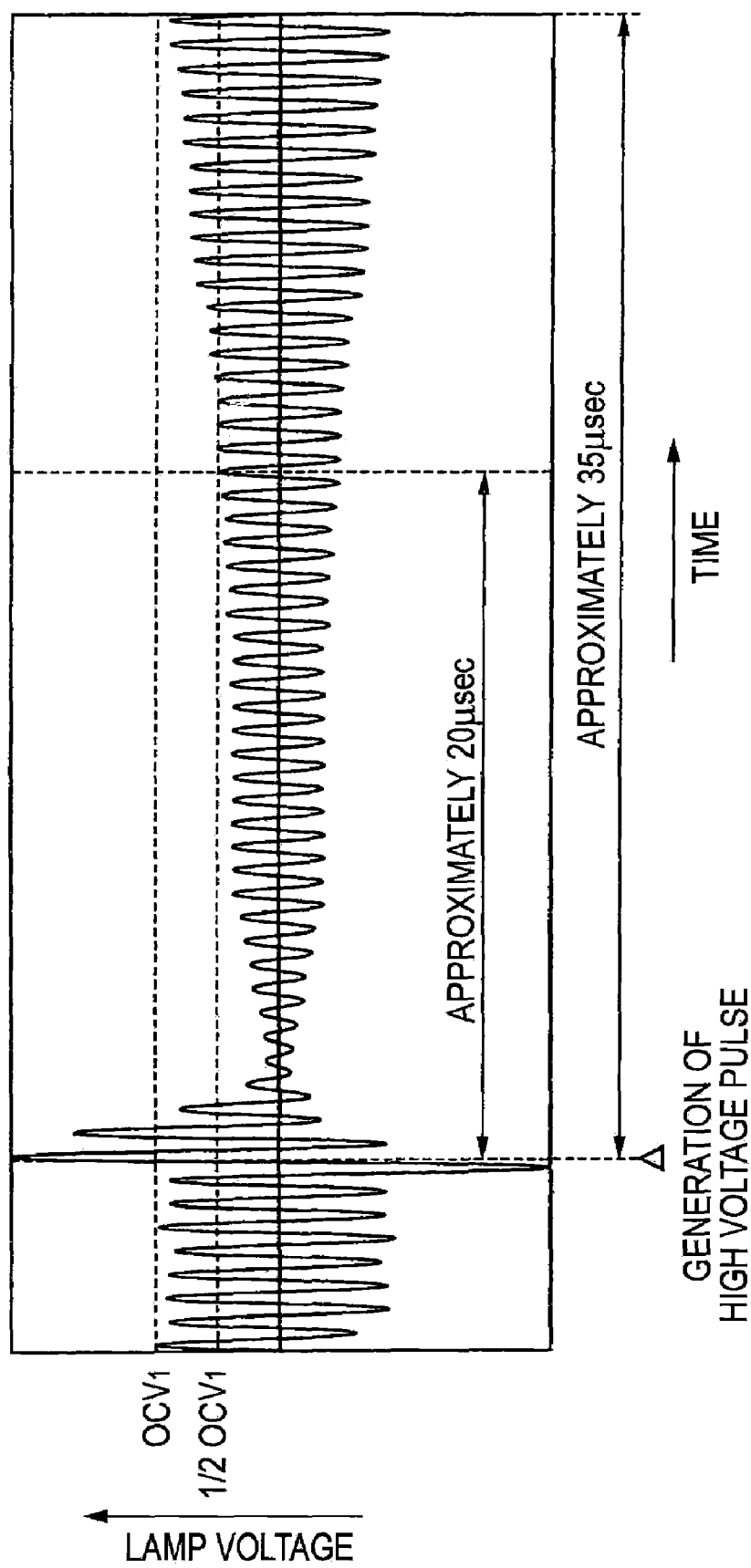

DISCHARGE LAMP LIGHTING CIRCUIT

TECHNICAL FIELD

This application claims the benefit of priority from Japanese Patent Application No. JP2006-245793, the disclosure of which is incorporated by reference herein.

The present disclosure relates to a discharge lamp lighting circuit.

BACKGROUND

A lighting circuit (ballast) for supplying a power in a stable manner is required for turning ON a discharge lamp such as a metal halide lamp to be used in a headlamp for a vehicle. For example, a discharge lamp lighting circuit disclosed in Japanese patent document JP-A-2001-6894 comprises an H bridge circuit, and an AC power is supplied from the H bridge circuit to a discharge lamp.

The discharge lamp lighting circuit also controls to turn ON the discharge lamp. More specifically, the discharge lamp lighting circuit controls a no-load output voltage (OCV: Open Circuit Voltage) before turning ON the discharge lamp and applies a high voltage pulse to the discharge lamp to turn ON the discharge lamp, and then carries out a transition to a stationary lighting state while reducing the transient input power.

In the discharge lamp lighting circuit having the structure described in the JP-A-2001-6894, power is stored in a capacitor having a large capacity and a current is supplied from the capacitor to the discharge lamp immediately after the lighting operation so that the discharge lamp can be turned ON in a stable manner. In the discharge lamp lighting circuit having a series resonant circuit, however, the capacitor sometimes is not provided in order to reduce a size of the circuit. Accordingly, an arc is not grown in the discharge lamp, resulting in a failure in the lighting operation after the high voltage pulse is applied. In the case in which the lighting operation fails, the discharge lamp lighting circuit needs to execute the lighting control again. For this reason, it is important to determine whether the lighting operation for the discharge lamp is successful or not.

Conventionally, it has been determined whether the lighting operation is successful or not depending on the presence of a current flowing to the discharge lamp (which will be hereinafter referred to as a lamp current). More specifically, the determination is based on whether or not a lamp current value exceeds a predetermined threshold. However, the lamp current obtained immediately after the lighting operation is relatively low, and a long time is required for executing the lighting control again if the determination about the lighting operation is delayed until the lamp current value is increased so as to be detectable. In the case in which the discharge lamp is used in a headlamp for a vehicle, it is preferable that the time taken from the ON operation of a power supply to the lighting operation be as short as possible.

In view of the foregoing problems, it would be useful to have a discharge lamp lighting circuit capable of shortening the time required for executing a lighting control again.

SUMMARY

To address the foregoing problems, the disclosure provides, according to some implementations, a discharge lamp lighting circuit for supplying, to a discharge lamp, an AC power to turn ON the discharge lamp. The lighting circuit comprises a power supplying portion having a series resonant circuit including a plurality of switching units, at least one of an inductor or a transformer, and a capacitor, and a driving portion for driving the switching units and serving to supply the AC power to the discharge lamp. The lighting circuit includes a starting portion for applying a high voltage pulse to the discharge lamp, thereby promoting lighting, a lighting confirming portion for generating a lighting confirmation signal indicating that a lighting operation for the discharge lamp fails or is successful by the high voltage pulse or not, and a control portion for controlling a driving frequency of the driving portion based on the lighting confirmation signal. The lighting confirming portion generates the lighting confirmation signal based on a relationship of the magnitude between an interelectrode voltage of the discharge lamp (or an equivalent voltage thereto) and a first predetermined voltage when a predetermined time passes after the high voltage pulse is applied to the discharge lamp.

Various implementations include one or more of the features described below. For example, after the high voltage pulse is applied to the discharge lamp, an arc is formed between the electrodes of the discharge lamp if the lighting operation for the discharge lamp is successful. Therefore, the interelectrode voltage (which will be hereinafter referred to as a lamp voltage) rapidly decreases. In the case in which the lighting operation for the discharge lamp fails, however, the electrodes maintain a non-conducting state. Therefore, the lamp voltage instantaneously returns to OCV. In the case in which the lamp voltage (or the equivalent voltage thereto) is higher than the first predetermined voltage, it is possible to determine whether the lighting operation for the discharge lamp failed; the determination can be made in a short time. By making the decision when a predetermined time (preferably, a longer time than is required for the lamp voltage to return to the first predetermined voltage) passes after the high voltage pulse is applied to the discharge lamp, it is possible to reliably determine whether or not the lighting operation can be carried out. Thus, it is possible to determine in a reliable manner whether or not the lighting operation can be carried out in a short time. Therefore, it is possible to shorten the time required for executing the lighting control again.

In some cases, the lighting confirming portion includes a comparing circuit for comparing the interelectrode voltage (or the equivalent voltage thereto) with the first predetermined voltage, a pulse detecting circuit for generating a pulse applying signal indicative of a timing for applying the high voltage pulse, a delay circuit for delaying the pulse applying signal by the predetermined time, and a signal generating circuit for referring to a signal output from the comparing circuit in a timing indicated by the pulse applying signal which is delayed and generating the lighting confirmation signal indicative of non-lighting when the interelectrode voltage (or the equivalent voltage thereto) is higher than the first predetermined voltage.

In some cases, the starting portion has a capacitive unit for storing a power to generate the high voltage pulse, and the pulse detecting circuit sets, as a timing for applying the high voltage pulse, a timing in which a voltage on both ends of the capacitive unit exceeds a second predetermined voltage and is then decreased to be lower than the second predetermined voltage. Alternatively, the starting portion can have a capacitive unit for storing power to generate the high voltage pulse. In that case, and the pulse detecting circuit includes a differentiating circuit for differentiating a voltage on both ends of the capacitive unit and serves to generate the pulse applying signal based on a voltage output from the differentiating circuit. Using either of those structures, it is possible to generate the pulse applying signal.

In addition, some cases, the control portion causes the driving frequency to approximate a predetermined frequency which is higher than a frequency corresponding to a predetermined no-load output voltage (OCV) when inputting the lighting confirmation signal indicative of non-lighting from the lighting confirming portion and then reduces the driving frequency in such a manner that the interelectrode voltage approximates the predetermined no-load output voltage. In the case in which the lighting operation for the discharge lamp fails, the predetermined OCV cannot be always maintained even if the driving portion is controlled at an equal driving frequency to that before the application of the high voltage pulse. In the case in which the lighting operation for the discharge lamp fails, it is preferable to control the driving frequency again in such a manner that the lamp voltage approximates the predetermined OCV as described above.

According to some implementation, it is possible to shorten a time required for executing a lighting control again. Other features and advantages will be apparent from the detailed description, the accompanying drawings, and the claims.

BRIEF DESCRIPTION OF THE DRAWINGS

FIG. 8 is a timing chart for explaining an operation of the lighting confirming portion, (a) to (h) showing a transition of a lamp voltage, a voltage on both ends of a capacitor, a pulse applying signal, a Q output of a JK flip-flop of the delay circuit, a voltage output from a comparing circuit, a Q bar output of the JK flip-flop of the delay circuit, a Q output of a D flip-flop of the signal generating circuit and a lighting confirmation signal, respectively, FIG. 9 is a graph showing a state of a change in a lamp voltage when a lighting operation for the discharge lamp fails.

DETAILED DESCRIPTION

An embodiment of a discharge lamp lighting circuit according to the invention will be described below in detail with reference to the accompanying drawings.

Figure 1:
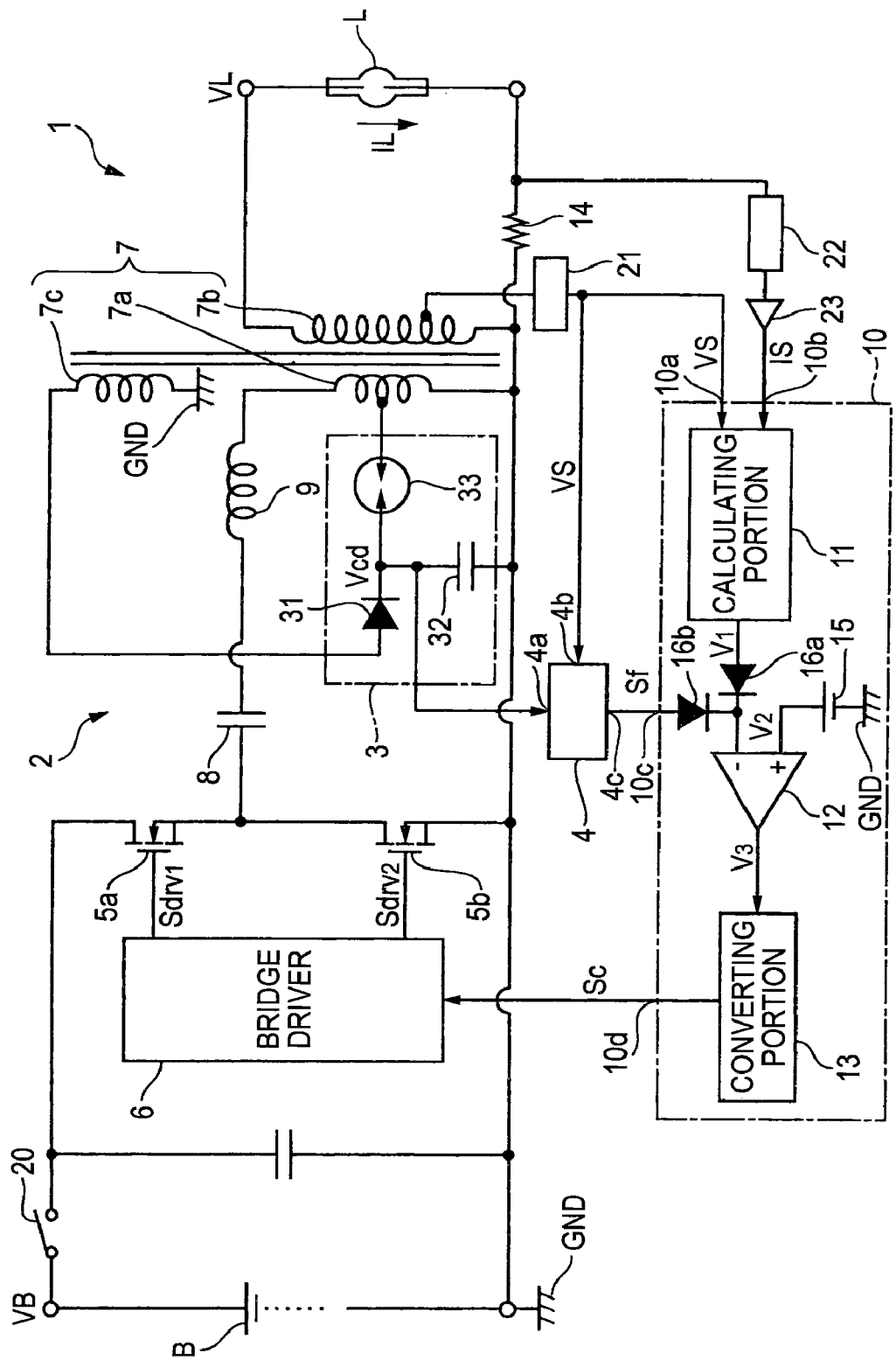
FIG. 1 is a block diagram showing an example of a discharge lamp lighting circuit in accordance with the invention.

FIG. 1 is a block diagram showing an example of a discharge lamp lighting circuit in accordance with the invention. The discharge lamp lighting circuit 1 shown in FIG. 1 serves to supply, to a discharge lamp L, an alternating current ("AC") power for turning ON the discharge lamp L, and converts a DC voltage ("VB") applied from a direct current ("DC") power supply B into an AC voltage and supplies the AC voltage to the discharge lamp L. The discharge lamp lighting circuit 1 is mainly used for a lighting device, particularly, a headlamp for a vehicle. For the discharge lamp L, a mercury free metal halide lamp can be used, for example, although discharge lamps having other structures may be used as well.

The discharge lamp lighting circuit 1 comprises a power supplying portion 2 for supplying an AC power to the discharge lamp L upon receipt of a supply of a power from the DC power supply B, a starting portion 3 for applying a high voltage pulse to the discharge lamp L, thereby promoting a lighting operation at a time of a lighting start, a lighting confirming portion 4 for generating a lighting confirmation signal Sf indicating that a lighting operation for the discharge lamp fails or is successful depending on the high voltage pulse, and a control portion 10 for controlling a driving frequency of a bridge driver 6 based on a lamp voltage VL and a lamp current IL in the discharge lamp L, and the lighting confirmation signal Sf.

The power supplying portion 2 supplies, to the discharge lamp L, a power having a magnitude based on a control signal Sc sent from the control portion 10 or OCV. The power supplying portion 2 is connected to a DC power supply B (such as a battery) through a switch 20 for a lighting operation. The power supplying portion 2 serves to carry out an AC conversion and raises a voltage upon receipt of the DC voltage VB from the DC power supply B. The power supplying portion 2 according to the illustrated embodiment has two transistors 5a and 5b which function as switching units, and a bridge driver 6 which drives the transistors 5a and 5b. Although an N channel MOSFET can be used for the transistors 5a and 5b as shown in FIG. 1, other FETs and bipolar transistors may be used as well. In the illustrated embodiment, the transistor 5a has a drain terminal connected to a terminal on a positive side of the DC power supply B, a source terminal connected to a drain terminal of the transistor 5b, and a gate terminal connected to the bridge driver 6. Moreover, the transistor 5b has a source terminal connected to a ground potential line GND (that is, a terminal on a negative side of the DC power supply B) and a gate terminal connected to the bridge driver 6. The bridge driver 6 supplies driving signals $Sdrv_1$ and $Sdrv_2$ having opposite phases to each other to the gate terminals of the transistors 5a and 5b, thereby conducting the transistors 5a and 5b alternately.

The power supplying portion 2 according to the illustrated embodiment also has a transformer 7, a capacitor 8 and an inductor 9. The transformer 7 is provided for applying a high voltage pulse to the discharge lamp L, and furthermore, for transmitting a power and raising a voltage of the power. Moreover, the transformer 7, the capacitor 8 and the inductor 9 constitute a series resonant circuit. More specifically, a primary winding 7a of the transformer 7, the inductor 9 and the capacitor 8 are connected in series to each other. One end of the series circuit is connected to the source terminal of the transistor 5a and the drain terminal of the transistor 5b, and the other end is connected to the ground potential line GND. A resonant frequency is determined by a synthetic reactance composed of a leakage inductance of the primary winding 7a of the transformer 7, an inductance of the inductor 9 and a capacitance of the capacitor 8. The series resonant circuit may be composed only of the primary winding 7a and the capacitor 8, and the inductor 9 may be omitted. Moreover, an inductance of the primary winding 7a can be set to be much smaller than that of the inductor 9, and the resonant frequency can be almost determined by the inductor 9 and the capacitance of the capacitor 8.

In the power supplying portion 2, a series resonance phenomenon caused by the capacitor 8 and inductive elements (an inductance component and the inductor) is utilized to define the driving frequencies of the transistors 5a and 5b to be values which are equal to or greater than the series resonant frequency, thereby turning ON/OFF the transistors 5a and 5b alternately to generate an AC power or the OCV on the primary winding 7a of the transformer 7. The AC power or the OCV is boosted and transmitted to a secondary winding 7b of the transformer 7, and is supplied to the discharge lamp L connected to the secondary winding 7b. The bridge driver 6 for driving the transistors 5a and 5b reciprocally drives the transistors 5a and 5b so as to prevent both of the transistors 5a and 5b from being brought into a connecting state. The driving frequency of the bridge driver 6 according to the illustrated embodiment is a high frequency of 1 MHz or more, for example.

Figure 2:
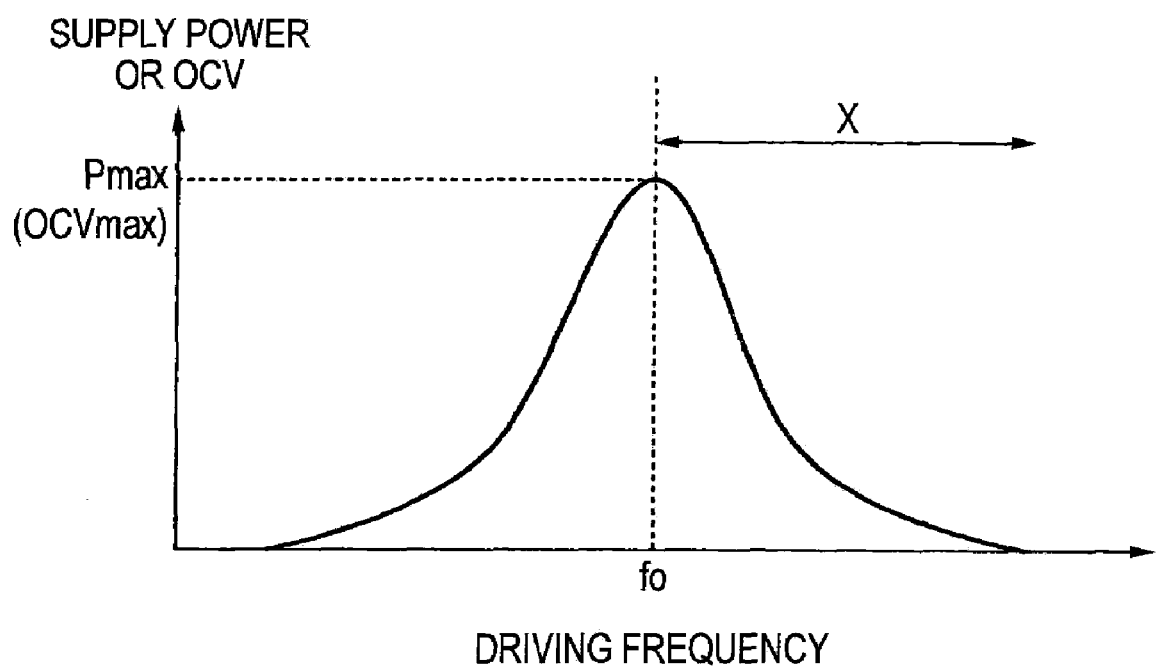
FIG. 2 is a graph conceptually showing a relationship between a driving frequency of a transistor and a magnitude of a supply power and OCV.

An impedance of the series resonant circuit is changed depending on the driving frequencies of the transistors 5a and 5b through the bridge driver 6. Accordingly, it is possible to control the magnitude of the AC power or the OCV supplied to the discharge lamp L by changing the driving frequencies. FIG. 2 is a graph conceptually showing a relationship between the driving frequencies of the transistors 5a and 5b and the magnitudes of the supply power and the OCV. As shown in FIG. 2, the magnitudes of the OCV and the power supplied to the discharge lamp L have maximum values Vmax and Pmax when the driving frequency is equal to a series resonant frequency fo (which is varied before and after the lighting operation) and are decreased respectively when the driving frequency becomes higher (or lower) than the series resonant frequency fo. In the case in which the driving frequency is lower than the series resonant frequency fo, the switching loss is increased so that the efficiency is reduced. Accordingly, the magnitude of the driving frequency of the bridge driver 6 is controlled in a region in which the driving frequency is higher than the series resonant frequency fo (region X in the drawing). A frequency region in which the driving frequency is lower than the series resonant frequency fo is referred to as a capacitive region, and a frequency region in which the driving frequency is higher than the series resonant frequency fo is referred to as an inductive region. In the illustrated embodiment, the driving frequency of the bridge driver 6 is controlled in accordance with a pulse frequency of a control signal Sc (a signal including a pulse train having a frequency modulated) which is sent from the control portion 10 connected to the bridge driver 6.

Moreover, the series resonant frequency fa before turning ON the series resonant circuit and the series resonant frequency fb after the lighting operation are expressed in the following equations (1) and (2), respectively. In the equations, C represents the capacitance of the capacitor 8, Lr represents the inductance of the inductor 9, Lp1 represents an inductance of the primary winding 7a before the lighting operation, and Lp2 represents an inductance of the primary winding 7a after the lighting operation.

[Equation 1]
$$fa = \frac{1}{2\pi\sqrt{C \cdot (Lr + Lp1)}} \quad (1)$$

[Equation 2]
$$fb = \frac{1}{2\pi\sqrt{C \cdot (Lr + Lp2)}} \quad (2)$$

In general, Lp1>Lp2 is set. Therefore, it is apparent that the series resonant frequency fa before the lighting operation is smaller than the series resonant frequency fb after the lighting operation.

The starting portion 3 serves to apply a high voltage pulse to the discharge lamp L to promote turning ON the discharge lamp L. More specifically, when a trigger voltage and current is applied from the starting portion 3 to the primary winding 7a of the transformer 7, a high voltage pulse having a high voltage value and a small pulse width is superposed on an AC voltage generated in the secondary winding 7b. The starting portion 3 has a diode 31, a capacitor (a capacitive unit) 32 for storing power to generate the high voltage pulse, and a switching unit 33 of a self-breakdown type such as a spark gap or a gas arrester. The diode 31 has an anode connected to one end of an auxiliary winding 7c of the transformer 7 and a cathode connected to one of ends of the capacitor 32. Both of the respective other ends of the auxiliary winding 7c and the capacitor 32 are connected to a ground potential line GND. An input voltage to the anode of the diode 31 may be obtained from the secondary winding 7b of the transformer 7 or an auxiliary winding constituting a transformer together with the inductor 9 may be provided to obtain the input voltage therefrom, for example.

One end of the switching unit 33 of the self-breakdown type is connected to one end of the capacitor 32, and the other end of the switching unit 33 of the self-breakdown type is connected to the middle of the primary winding 7a. In the starting portion 3, when a voltage Vcd on both ends of the capacitor 32 reaches a discharge starting voltage of the switching unit 33 of the self-breakdown type, the switching unit 33 of the self-breakdown type is brought instantaneously into a conducting state so that the trigger voltage and current are provided as output. Moreover, the end of the capacitor 32 is connected to the lighting confirming portion 4, and the starting portion 3 provides the voltage Vcd on both ends of the capacitor 32 to the lighting confirming portion 4.

The lighting confirming portion 4 generates the lighting confirmation signal Sf indicating that the lighting operation for the discharge lamp fails or is successful by the high voltage pulse based on the voltage Vcd on both ends of the capacitor 32 and the lamp voltage VL of the discharge lamp L. The lighting confirming portion 4 has input terminals 4a and 4b, and an output terminal 4c. The input terminal 4a is connected to one end of the capacitor 32 of the starting portion 3 in order to provide the voltage Vcd on both ends of the capacitor 32. The input terminal 4b is connected to an intermediate tap of the secondary winding 7b through a peak hold circuit 21 in order to provide a signal (hereinafter referred to as a lamp voltage equivalent signal) VS indicative of an amplitude of the lamp voltage VL of the discharge lamp L. The lamp voltage equivalent signal VS indicates an equivalent voltage to the lamp voltage VL and is set to be 0.35 time as great as a peak value of the lamp voltage VL, for example. The output terminal 4c is connected to the control portion 10, and the lighting confirmation signal Sf is provided to the control portion 10.

The lighting confirming portion 4 generates the lighting confirmation signal Sf in the following manner. When the voltage Vcd on both ends of the capacitor 32 exceeds a predetermined voltage (a second predetermined voltage, for example, 90% of a discharge starting voltage of the switching unit 33 of the self-breakdown voltage) and then decreases to be lower than the predetermined voltage, the lighting confirming portion 4 recognizes that the high voltage pulse is applied from the starting portion 3 to the discharge lamp L. Then, the lighting confirming portion 4 refers to a value of the lamp voltage equivalent signal VS at a time that a predetermined time (for example, 2 to 3 milliseconds) passes since the application of the high voltage pulse to the discharge lamp L. In the case in which the lighting operation for the discharge lamp L is successful, the lamp voltage VL should be decreased rapidly. For this reason, the lighting confirming portion 4 generates the lighting confirmation signal Sf based on the relationship of the magnitude between the lamp voltage equivalent signal VS and the predetermined voltage (the first predetermined voltage). For example, the lighting confirming portion 4 according to the illustrated embodiment indicates that the lighting operation for the discharge lamp L fails (non-lighting) if the value of the lamp voltage equivalent signal VS is greater than the predetermined voltage. Therefore, the lighting confirmation signal Sf maintaining an L level is usually set to have an H level in a certain short time.

The control portion 10 controls the driving frequency of the bridge driver 6 based on the lamp voltage VL and the lamp current IL in the discharge lamp L, and the lighting confirmation signal Sf. More specifically, the control portion 10 controls the driving frequency of the bridge driver 6, thereby controlling the OCV supplied to the discharge lamp L before the lighting operation for the discharge lamp L and controlling the magnitude of a supply power to the discharge lamp L after the lighting operation for the discharge lamp L. Moreover, the control portion 10 carries out the lighting control again by starting from the control of the OCV if the lighting confirmation signal Sf indicates the non-lighting of the discharge lamp L.

The control portion 10 has input terminals 10a to 10c, and an output terminal 10d. The input terminal 10a is connected to the peak hold circuit 21 in order to provide the lamp voltage equivalent signal VS. The input terminal 10b is connected through the peak hold circuit 22 and the buffer 23 to one end of a resistive unit 14 for detecting the lamp current IL of the discharge lamp L. One end of the resistive unit 14 is connected to an electrode of the discharge lamp L through an output terminal of the discharge lamp lighting circuit 1, and the other end of the resistive unit 14 is connected to a ground potential line GND. A signal IS indicative of an amplitude of the lamp current IL (which will be hereinafter referred to as a lamp current equivalent signal) is provided from the buffer 23. The input terminal 10c is connected to the output terminal 4c of the lighting confirming portion 4 in order to provide the lighting confirmation signal Sf. The output terminal 10d is connected to the bridge driver 6 and the control signal Sc is provided to the bridge driver 6.

The control portion 10 according to the embodiment has a calculating portion 11, an error amplifier 12 and a V-F converting portion 13. The calculating portion 11 provides the lamp voltage equivalent signal VS through the input terminal 10a of the control portion 10 and provides the lamp current equivalent signal IS through the input terminal 10b of the control portion 10. The calculating portion 11 generates an output voltage $V_1$ in such a manner that the lamp voltage equivalent signal VS indicative of the magnitude of the OCV approximates a predetermined value before the lighting operation for the discharge lamp L and generates the output voltage $V_1$ in such a manner that the magnitude of the supply power approximates a predetermined value based on the lamp voltage equivalent signal VS and the lamp current equivalent signal IS after the lighting operation for the display lamp L.

The error amplifier 12 is provided in a latter stage of the calculating portion 11. Either the output voltage $V_1$ applied from the calculating portion 11 or the lighting confirmation signal Sf sent from the lighting confirming portion 4 is provided to an inverting input terminal of the error amplifier 12. In the illustrated embodiment, the calculating portion 11 and the lighting confirming portion 4 are connected to the error amplifier 12 through diodes 16a and 16b, respectively, and either the output voltage $V_1$ or the lighting confirmation signal Sf which is a signal voltage having a higher voltage (that is, a signal voltage for increasing the driving frequency of the bridge driver 6 more greatly) is provided to the inverting input terminal of the error amplifier 12. More specifically, in the case in which the lighting operation for the discharge lamp L fails despite the generation of the high voltage pulse, the lighting confirmation signal Sf is set to have the H level in only a short time and is higher than the output voltage $V_1$. In the meantime, therefore, the lighting confirmation signal Sf is provided to the inverting input terminal of the error amplifier 12. In the other cases, the lighting confirmation signal Sf has the L level and is lower than the output voltage $V_1$. Therefore, the output voltage $V_1$ is provided to the inverting input terminal of the error amplifier 12. A non-inverting input terminal of the error amplifier 12 is connected to a voltage source 15 for generating a predetermined reference voltage $V_2$. A voltage $V_3$ output from the error amplifier 12 is provided to the V-F converting portion 13. In the case in which a phase of an input/output of the error amplifier 12 is to be compensated, the inverting input terminal and the output terminal may be connected to each other through a capacitor to constitute a negative feedback circuit. In this case, a response speed of the control portion 10 is changed depending on the capacitance of the capacitor.

The V-F converting portion 13 carries out a V-F conversion over the output voltage $V_3$ to be an analog signal and generates the control signal Sc including a pulse train of a frequency corresponding to a voltage value of the output voltage $V_3$. The V-F converting portion 13 provides the control signal Sc to the bridge driver 6.

Figure 3:
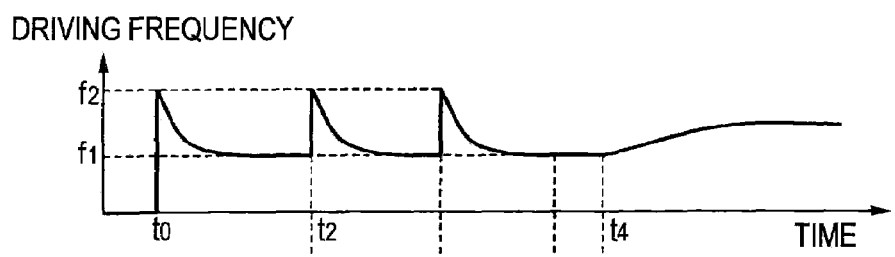
FIG. 3 is a graph showing a transition from an ON operation of a power supply of (a) a driving frequency, (b) a voltage on both ends of a capacitor, (c) a lamp voltage, (d) a lighting confirmation signal and (e) a supply power, respectively.
Figure 3:
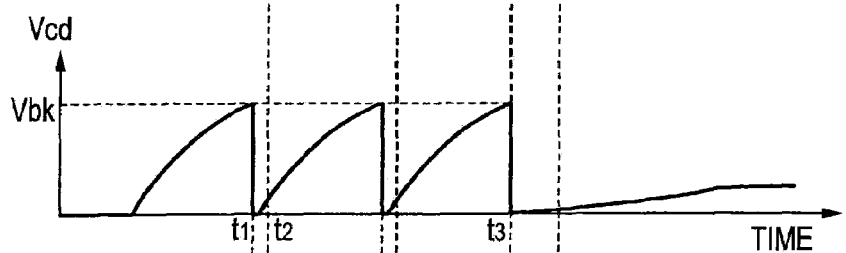
Figure 3:
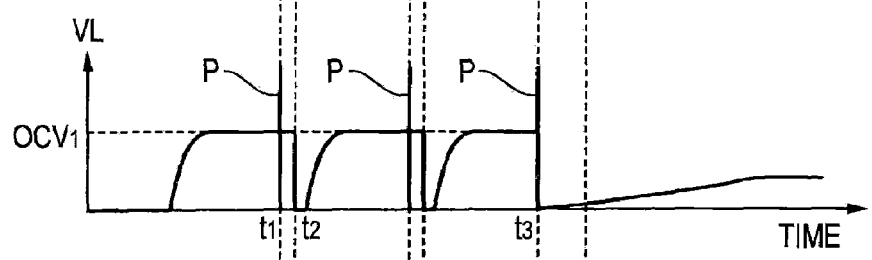
Figure 3:
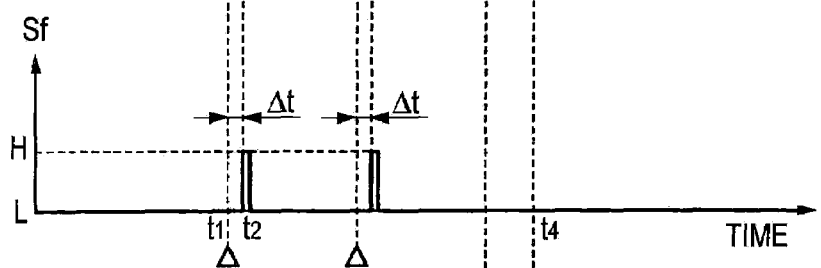
Figure 3:
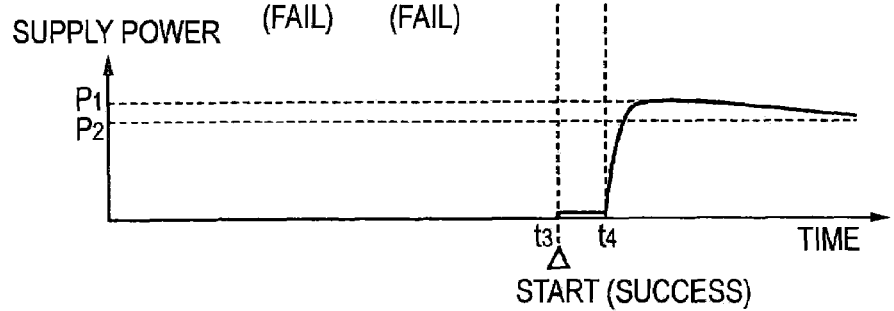
Figure 4:
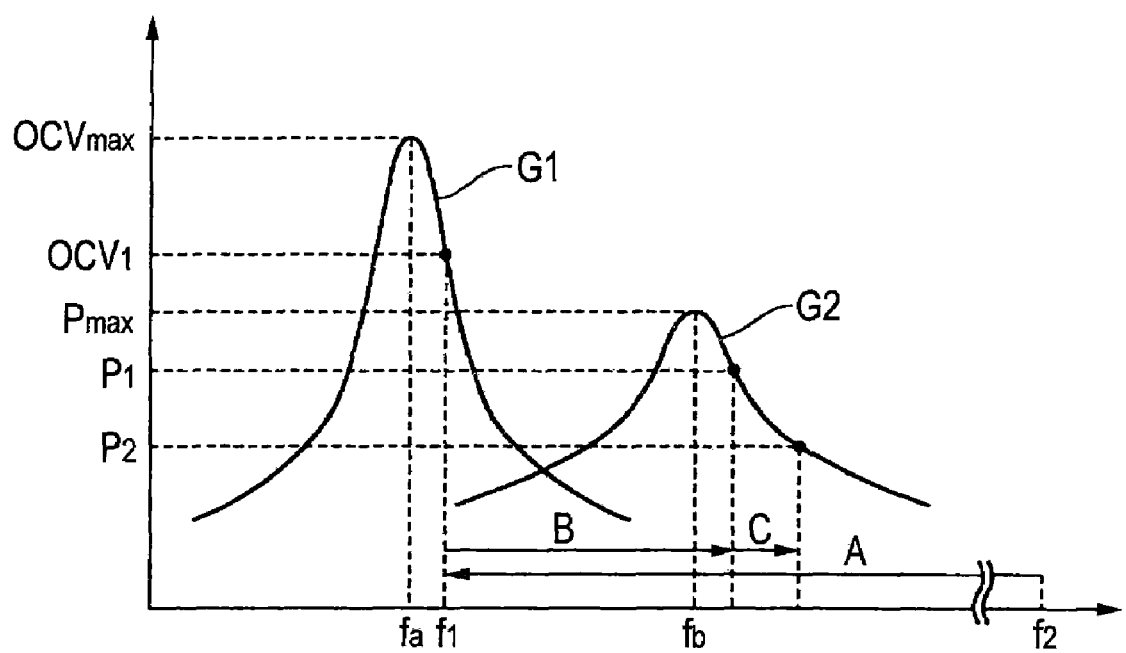
FIG. 4 is a graph showing a relationship between OCV and a driving frequency before a lighting operation for a discharge lamp (a graph G1) and a relationship between a supply power and the driving frequency after the lighting operation for the discharge lamp (a graph G2)

The operation of the discharge lamp lighting circuit 1 will be described with reference to FIGS. 3 and 4. FIG. 3 is a graph showing a transition from an ON operation of the power supply for (a) the driving frequency, (b) the voltage Vcd on both ends of the capacitor 32, (c) the lamp voltage VL, (d) the lighting confirmation signal Sf and (e) the supply power. FIG. 4 is a graph showing a relationship between the OCV and the driving frequency before the lighting operation for the discharge lamp L (graph G1) and a relationship between the supply power and the driving frequency after the lighting operation for the discharge lamp L (graph G2). In FIG. 4, a central frequency fa of the graph G1 indicates the series resonant frequency before the lighting operation and a central frequency fb of the graph G2 indicates the series resonant frequency after the lighting operation.

When the discharge lamp lighting circuit 1 is turned ON (a time $t_0$), the control portion 10 causes the driving frequency of the bridge driver 6 to approximate a predetermined frequency $f_2$ as shown in FIG. 3(a). The frequency $f_2$ is higher (for example, 3 MHz) than a driving frequency band at a stationary time of the power supplying portion 2 (for example, 1 MHz to 2.5 MHz), and is higher than a frequency $f_1$ (>fa) corresponding to predetermined $OCV_1$ to be target OCV as shown in FIG. 4.

Subsequently, the control portion 10 reduces the driving frequency by a feedback control in such a manner that the voltage VL approximates the predetermined $OCV_1$ (an arrow A in FIG. 4). When the OCV is stabilized into the predetermined $OCV_1$, the calculating portion 11 of the control portion 10 carries out a control in such a manner that the OCV holds the predetermined $OCV_1$, thereby generating an output voltage $V_1$ to be operated at the frequency $f_1$ corresponding to the $OCV_1$. As shown in FIG. 3(b), an electric charge is stored in the capacitor 32 and the voltage Vcd on both ends is raised gradually. When the voltage Vcd on both ends reaches a discharge starting voltage Vbk of the switching unit 33 of the self-breakdown type, the switching unit 33 of the self-breakdown type is instantaneously short-circuited so that a high voltage pulse P is applied to the discharge lamp L (a time $t_1$ in FIG. 3(c)). When the lighting operation for the discharge lamp L fails, an arc is not grown in the discharge lamp L. As shown in FIG. 3(c), therefore, the lamp voltage VL instantaneously returns to the vicinity of the $OCV_1$.

The lighting confirming portion 4 refers to a value of the lamp voltage equivalent signal VS at a time $t_2$ that a predetermined time $\Delta t$ passes since the time $t_1$ that the high voltage pulse is applied to the discharge lamp L. In the example, the lamp voltage VL returns to the vicinity of the $OCV_1$ due to the non-lighting. Therefore, the lighting conforming portion 4 provides, to the control portion 10, the lighting confirmation signal Sf having the H level indicative of the non-lighting (FIG. 3(d)).

When the lighting confirmation signal Sf having the H level is provided to the control portion 10, the output voltage $V_3$ of the error amplifier 12 is decreased instantaneously so that the frequency of the control signal Sc is increased. Consequently, the driving frequency of the bridge driver 6 carries out a transition to $f_2$ again. When the lighting confirmation signal Sf returns to the L level, the calculating portion 11 of the control portion 10 reduces the driving frequency in such a manner that the lamp voltage VL approximates the predetermined $OCV_1$. Subsequently, the discharge lamp lighting circuit 1 repeats the operation until the lighting operation for the discharge lamp L is successful.

When the lighting operation for the discharge lamp L is successful by application of the high voltage pulse P (a time $t_3$), the arc is grown in the discharge lamp L so that the lamp voltage VL is decreased (FIG. 3(c)). Accordingly, the lighting confirmation signal Sf output from the lighting confirming portion 4 is maintained to have the L level. When the lamp current IL is increased to some degree so that the lamp current equivalent signal IS can be detected (a time $t_4$), the control portion 10 increases the driving frequency in such a manner that the supply power to the discharge lamp L (that is, a product of the lamp voltage IL and the lamp current IL) approximates a supply power value $P_1$ (an arrow B in FIG. 4). Thereafter, the control portion 10 further increases the driving frequency in such a manner that the supply power to the discharge lamp L approximates a steady value $P_2$ (<$P_1$) in accordance with a predetermined time function (an arrow C in FIG. 4).

Figure 5:
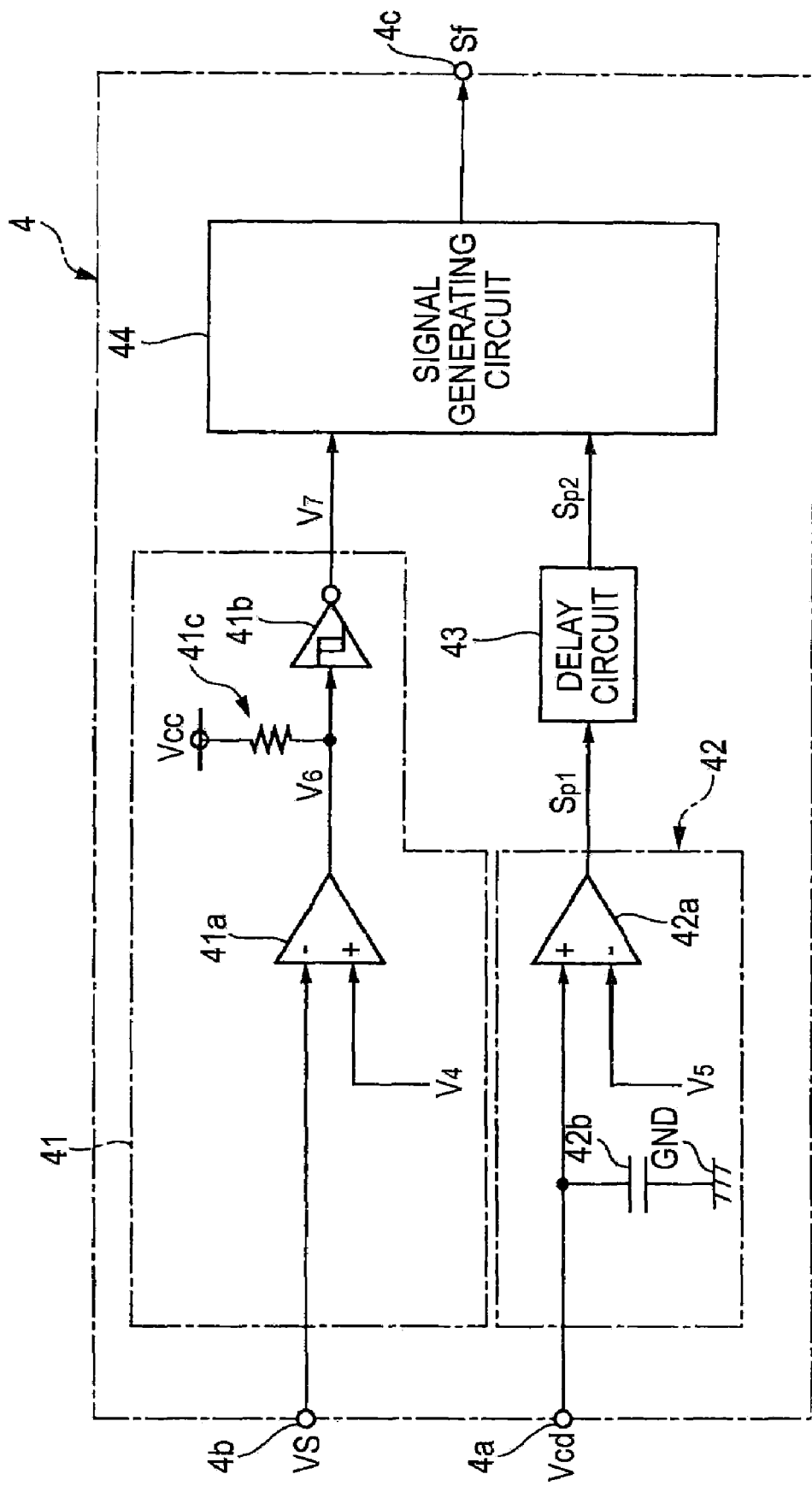
FIG. 5 is a diagram showing an example of an internal structure of a lighting confirming portion.

Next, a description will be given of an example of an internal structure of the lighting confirming portion 4 according to the illustrated embodiment. FIG. 5 is a diagram showing an example of the internal structure of the lighting confirming portion 4. With reference to FIG. 5, the lighting confirming portion 4 has a comparing circuit 41, a pulse detecting circuit 42, a delay circuit 43 and a signal generating circuit 44.

The comparing circuit 41 serves to compare the lamp voltage equivalent signal VS with a predetermined voltage (a first predetermined voltage) $V_4$. The comparing circuit 41 includes a comparator 41a and a Schmitt trigger 41b. A lamp voltage equivalent signal VS is provided to a negative input terminal of the comparator 41a through the input terminal 4b of the lighting confirming portion 4. The predetermined voltage $V_4$ is provided to a positive input terminal of the comparator 41a. The predetermined voltage $V_4$ is set to have a magnitude of the lamp voltage equivalent signal VS which is equivalent to 50% of the $OCV_1$ shown in FIGS. 3 and 4, for example. The comparator 41a provided a voltage having the L level when the lamp voltage equivalent signal VS exceeds the predetermined voltage $V_4$, and provided a voltage having the H level when the lamp voltage equivalent signal VS does not exceed the predetermined voltage $V_4$. A voltage $V_6$ from the comparator 41a is provided to the Schmitt trigger 41b through a pull-up circuit 41c. Then, a voltage $V_7$ obtained by inverting the H level/L level of the voltage $V_6$ is provided from the Schmitt trigger 41b to the signal generating circuit 44.

The pulse detecting circuit 42 serves to generate a pulse applying signal $Sp_1$ indicative of a timing at which the high voltage pulse is applied. The pulse detecting circuit 42 includes a comparator 42a. The voltage Vcd on both ends of the capacitor 32 is provided to a positive input terminal of the comparator 42a through the input terminal 4a of the lighting confirming portion 4. A capacitor 42b is provided between a positive input terminal of the comparator 42a and a ground potential line GND. A predetermined voltage (a second predetermined voltage) $V_5$ is provided to a negative input terminal of the comparator 42a. As described above, the predetermined voltage $V_5$ is set to be 90% of the discharge starting voltage Vbk of the switching unit 33 of the self-breakdown type, for example. The comparator 42a provides a voltage having the H level when the voltage Vcd on both ends exceeds the predetermined voltage $V_5$, and provides a voltage having the L level when the voltage Vcd on both ends does not exceed the predetermined voltage $V_5$. A voltage signal from the comparator 42a is provided as the pulse applying signal $Sp_1$ to the delay circuit 43. Then, the pulse applying signal $Sp_1$ is delayed by a predetermined time ($\Delta t$ in FIG. 3(d)) in the delay circuit 43 and is provided as a pulse applying signal $Sp_2$ to the signal generating circuit 44.

The signal generating circuit 44 generates the lighting confirmation signal Sf indicating whether the lighting operation is carried out by an application of the high voltage pulse based on the voltage $V_7$ from the comparing circuit 41 and the pulse applying signal $Sp_2$ which is sent from the delay circuit 43. More specifically, the signal generating circuit 44 refers to the voltage $V_7$ from the comparing circuit 41 in a timing indicated by the pulse applying signal $Sp_2$, and the lighting confirmation signal Sf is set to have the H level (non-lighting) if the output voltage $V_7$ has the H level (that is, the lamp voltage equivalent signal VS is higher than the predetermined voltage $V_4$) and is maintained to have the L level if the output voltage $V_7$ has the L level (that is, the lamp voltage equivalent signal VS is lower than the predetermined voltage $V_4$).

Figure 6:
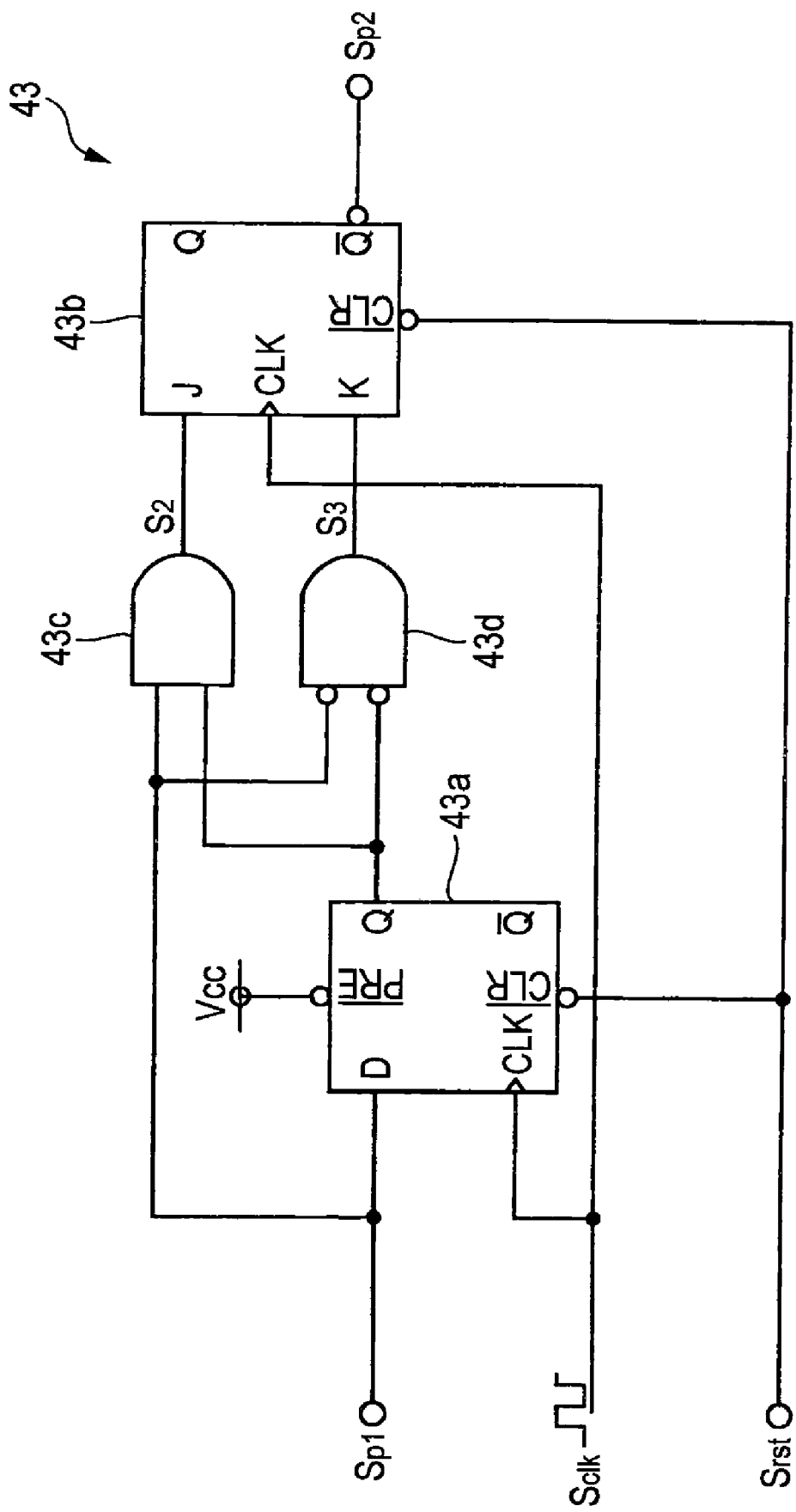
FIG. 6 is a circuit diagram showing an example of a delay circuit.

FIG. 6 is a circuit diagram showing an example of a specific structure of the delay circuit 43. The delay circuit 43 is constituted to include a D flip-flop 43a, a JK flip-flop 43b, an AND gate 43c, and a NOR gate 43d as shown in FIG. 6, for example. The pulse applying signal $Sp_1$ is provided from the pulse detecting circuit 42 to a D terminal of the D flip-flop 43a and a clock signal Sclk for setting the predetermined time Δt (for example, 2 milliseconds) to be one cycle is provided to a clock (CK) terminal. Then, a Q output (a signal $S_1$) of the D flip-flop 43a is provided to both the AND gate 43c and the NOR gate 43d in a latter stage.

The pulse applying signal $Sp_1$ is provided to the AND gate 43c in addition to the signal $S_1$ sent from the D flip-flop 43a. Then, a signal $S_2$ indicative of AND of these signals is provided to a J terminal of the JK flip-flop 43b in the latter stage. Similarly, the pulse applying signal $Sp_1$ is also provided to the NOR gate 43d in addition to the signal $S_1$. Thereafter, a signal $S_3$ indicative of negative OR of these signals is provided to a K terminal of the JK flip-flop 43b in the latter stage. The clock signal Sclk is provided to a clock (CK) terminal of the JK flip-flop 43b. Then, a Q bar output (an inverted output of the Q output) of the JK flip-flop 43b is provided as a pulse applying signal $Sp_2$ to the signal generating circuit 44 in the latter stage.

A power-ON reset signal Srst, generated when the discharge lamp lighting circuit 1 is turned ON, is provided to clear (CLR) terminals of the D flip-flop 43a and the JK flip-flop 43b.

Figure 7:
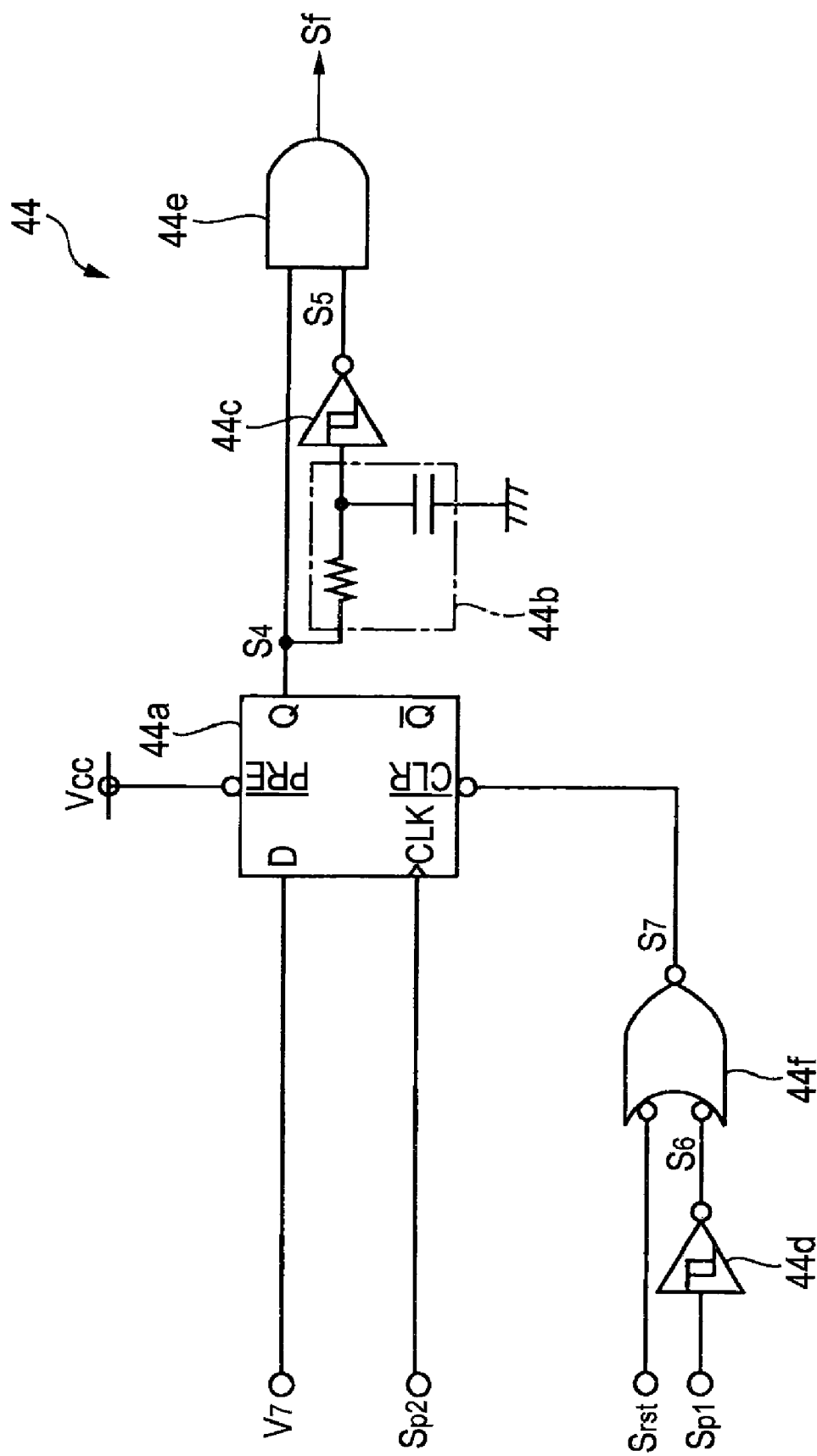
FIG. 7 is a circuit diagram showing an example of a signal generating circuit.

FIG. 7 is a circuit diagram showing an example of a specific structure of the signal generating circuit 44. The signal generating circuit 44 includes a D flip-flop 44a, a filter circuit 44b, Schmitt triggers 44c and 44d, and AND gates 44e and 44f as shown in FIG. 7, for example. A voltage $V_7$ is provided from the comparing circuit 41 to a D terminal of the D flip-flop 44a, and the pulse applying signal $Sp_2$ is provided from the delay circuit 43 to a clock (CK) terminal. Then, a Q output (a signal $S_4$) of the D flip-flop 44a is provided to both the filter circuit 44b and the AND gate 44e in the latter stage. The filter circuit 44b is a low-pass filter composed of a resistor and a capacitor. The signal $S_4$ is delayed and inverted by the filter circuit 44b and the Schmitt trigger 44c provided in the latter stage thereof. A signal $S_5$ from the Schmitt trigger 44c is provided to the AND gate 44e together with the Q output (the signal $S_4$) of the D flip-flop 44a. Then, a signal indicative of AND of these signals is provided as the lighting confirmation signal Sf to the control portion 10 (see FIG. 1).

A signal $S_6$ (obtained by inverting the pulse applying signal $Sp_1$ through the Schmitt trigger 44d) and the power-ON reset signal Srst are provided to the AND gate 44f. A signal $S_7$ from the AND gate 44f is provided to a clear (CLR) terminal of the D flip-flop 44a.

FIG. 8 is a timing chart for explaining an operation of the lighting confirming portion 4. FIG. 8, (a) to (h) show a transition of the lamp voltage VL, the voltage Vcd on both ends of the capacitor 32, the pulse applying signal $Sp_1$, the Q output of the JK flip-flop 43b of the delay circuit 43, the voltage $V_7$ from the comparing circuit 41, the Q bar output of the JK flip-flop 43b of the delay circuit 43 (that is, the pulse applying signal $Sp_2$), the Q output of the D flip-flop 44a of the signal generating circuit 44 (the signal $S_4$), and the lighting confirmation signal Sf, respectively.

When the discharge lamp lighting circuit 1 is turned ON, the lamp voltage VL is controlled to be the predetermined $OCV_1$ by the control portion 10 (FIG. 8(a)). At this time, the output voltage $V_7$ of the comparing circuit 41 rises to have the H level at a time ($t_a$) that the lamp voltage VL exceeds $V_4$ (FIG. 8(e)). When the voltage Vcd on both ends of the capacitor 32 reaches the predetermined voltage $V_5$ (at a time $t_b$), the pulse applying signal $Sp_1$ from the pulse detecting circuit 42 rises to the H level (FIG. 8(c)). Then, the Q output of the JK flip-flop 43b of the delay circuit 43 rises after the predetermined time Δt passes (FIG. 8(d)), and at the same time, the Q bar output to be the inverted signal, that is, the pulse applying signal $Sp_2$, falls (FIG. 8(f)).

When the voltage Vcd on both ends reaches the discharge starting voltage Vbk (a time $t_c$), subsequently, a high voltage pulse is applied to the discharge lamp L, and at the same time, the voltage Vcd on both ends is decreased to the vicinity of 0V. At this time, since the voltage Vcd on both ends is decreased to be lower than the predetermined voltage $V_5$, the pulse applying signal $Sp_1$ rises to the L level in the same timing (FIG. 8(c)). Accordingly, the pulse applying signal $Sp_1$ indicates a timing for applying the high voltage pulse through the rise. Then, the Q output of the JK flip-flop 43b of the delay circuit 43 falls after the passage of the predetermined time Δt (FIG. 8(d)), and at the same time, the pulse applying signal $Sp_2$ to be the inverted signal rises (FIG. 8(f)).

At this time, if the lighting operation for the discharge lamp L fails, the lamp voltage VL is controlled to be the $OCV_1$. Therefore, the voltage $V_7$ from the comparing circuit 41 is set to the H level again after a very short time (FIG. 8(e)). In this state, when the pulse applying signal $Sp_2$ rises, the Q output of the D flip-flop 44a (the signal $S_4$) rises (FIG. 8(g)), and the pulse-shaped lighting confirmation signal Sf is provided from the AND gate 44e upon receipt thereof (FIG. 8(h)). Thus, the lighting confirmation signal Sf rises like a pulse after the predetermined time Δt passes since the time $t_c$ that the high voltage pulse is applied to the discharge lamp L. The lighting confirmation signal Sf is provided to the control portion 10 so that the control portion 10 executes the lighting control again as shown in FIG. 3(d).

In the case in which the lighting operation for the discharge lamp L is successful (a time $t_d$), the lamp voltage VL is decreased to the vicinity of 0V immediately thereafter. Therefore, the output voltage $V_7$ of the comparing circuit 41 falls to the L level (FIG. 8(e)). Accordingly, the Q output (the signal $S_4$) of the D flip-flop 44a continuously maintains the L level (FIG. 8(g)), and the lighting confirmation signal Sf sent from the AND gate 44e also maintains the L level continuously (FIG. 8(h)).

Description will be given to the advantages that can be obtained in some implementations by the discharge lamp lighting circuit 1 according to the embodiment which has been explained above. In the discharge lamp lighting circuit 1, the lighting conforming portion 4 generates the lighting confirmation signal Sf based on the relationship of the magnitude between the lamp voltage equivalent signal VS to be the equivalent voltage to the lamp voltage VL of the discharge lamp L and the predetermined voltage $V_4$. In the case in which the lighting operation for the discharge lamp L is successful after the application of the high voltage pulse to the discharge lamp L, the arc is formed between the electrodes of the discharge lamp L. Therefore, the lamp voltage VL is decreased rapidly. In the case in which the lighting operation for the discharge lamp L fails, however, the lamp voltage VL instantaneously returns to the vicinity of the $OCV_1$ because the electrodes maintain a non-conducting state.

FIG. 9 is a graph showing a state of a change in the lamp voltage VL in the case in which the lighting operation for the discharge lamp L fails. As shown in FIG. 9, the lamp voltage VL returns to 50% of the $OCV_1$ in a very short time (approximately 20 microseconds in the drawing) after the high voltage pulse is applied. In the case in which the lamp voltage equivalent signal VS is larger than the predetermined voltage $V_4$ (for example, 50% of the $OCV_1$), it can be determined that the lighting operation for the discharge lamp L failed and the determination can be made in a very short time. By making the determination when the predetermined time Δt passes after the application of the high voltage pulse to the discharge lamp L, it is possible to reliably make the determination as to whether or not the lighting operation can be carried out. According to the discharge lamp lighting circuit 1 in accordance with the illustrated embodiment, whether the lighting operation can be carried out can be decided reliably in a short time. Consequently, it is possible to shorten a time required for executing the lighting control again. It is preferable that the time Δt should be set to be longer than a time taken for the lamp voltage equivalent signal VS to exceed the predetermined voltage $V_4$ after the application of the high voltage pulse (approximately 20 microseconds in FIG. 9).

In the illustrated embodiment, in the case in which the control portion 10 provides the lighting confirmation signal Sf indicative of the non-lighting from the lighting confirming portion 4, it causes the driving frequency of the bridge driver 6 to approximate the predetermined frequency $f_2$ which is higher than the frequency $f_1$ corresponding to the predetermined $OCV_1$ (see FIG. 4) and then reduces the driving frequency in such a manner that the lamp voltage VL approximates the predetermined $OCV_1$. It is preferable that the control portion 10 should thus control the driving frequency of the bridge driver 6 in the non-lighting. More specifically, in some cases in which the lighting operation for the discharge lamp L fails, the OCV characteristic fluctuates even if the bridge driver 6 is controlled at a driving frequency equal to that obtained before the application of the high voltage pulse. Therefore, the predetermined $OCV_1$ cannot always be maintained. In the case in which the lighting operation fails, it is possible to maintain the lamp voltage VL to be the predetermined $OCV_1$ by controlling the driving frequency again from the high frequency side in such a manner that the lamp voltage approximates the predetermined $OCV_1$ in the same manner as in a lighting sequence in the ON operation of the power supply. By such control, the lighting control immediately can be executed again (i.e., retried) when the lighting operation fails. Consequently, it is possible to suppress a lighting delay on a visual basis.

In the illustrated embodiment, the pulse detecting circuit 42 sets, as a timing for applying the high voltage pulse, a timing in which the voltage Vcd on both ends of the capacitor 32 exceeds the predetermined voltage $V_5$ and then is decreased to be lower than the predetermined voltage $V_5$. By utilizing the circuit components of the starting portion 3 in the detection of the pulse, it is possible to reduce the circuit scale. In the application of the high voltage pulse, moreover, a charging energy of the capacitor 32 is discharged at a time so that the voltage Vcd on both ends is decreased instantaneously. On the other hand, the voltage Vcd on both ends is raised gradually when the capacitor 32 is charged. According to the illustrated embodiment, therefore, it is possible to detect the timing for applying the high voltage pulse in a reliable manner.

Figure 10:
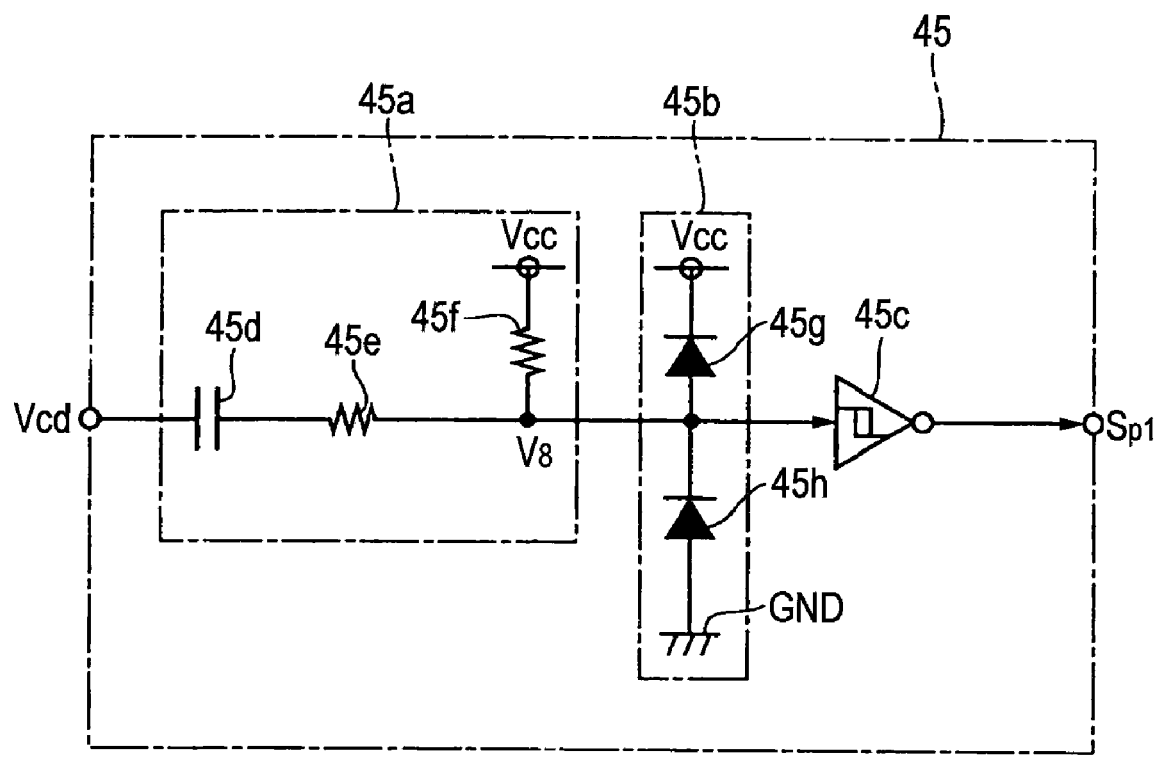
FIG. 10 is a circuit diagram showing a variant of a pulse detecting circuit provided in the lighting confirming portion.

FIG. 10 is a circuit diagram showing a variant of the pulse detecting circuit provided in the lighting confirming portion 4. The pulse detecting circuit 45 in FIG. 10 is includes a differentiating circuit portion 45a, a clamp portion 45b and a Schmitt trigger 45c.

The differentiating circuit portion 45a differentiates the voltage Vcd on both ends of the capacitor 32 (see FIG. 1). The differentiating circuit portion 45a includes a capacitor 45d and resistive units 45e and 45f. The voltage Vcd on both ends is provided to one end of the capacitor 45d and a source voltage Vcc is supplied to the other end of the capacitor 45d through the resistive units 45e and 45f. Moreover, the other end of the capacitor 45d is connected to the clamp portion 45b through the resistive unit 45e.

The clamp portion 45b limits a voltage $V_8$ output from the differentiating circuit portion 45a within a certain voltage range. The clamp portion 45b includes diodes 45g and 45h which are connected in series in a reverse direction between a source voltage Vcc and a ground potential line GND. A node between the diodes 45g and 45h is connected to an output terminal of the differentiating circuit portion 45a and is connected to an input terminal of the Schmitt trigger 45c. A voltage from the Schmitt trigger 45c is provided as the pulse applying signal $Sp_1$ to the delay circuit in the latter stage.

Figure 11:
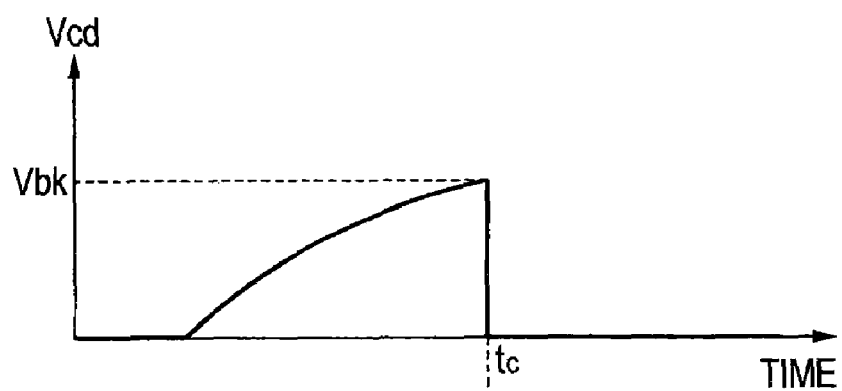
FIG. 11 is a graph showing an operation of the pulse detecting circuit according to the variant, (a) to (c) illustrating a transition of a voltage on both ends of a capacitor, a voltage output from a differentiating circuit portion and a voltage output from a Schmitt trigger, respectively.
Figure 11:
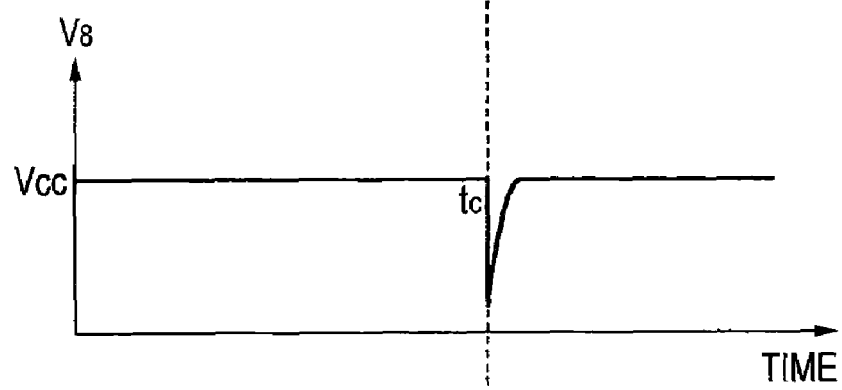
Figure 11:
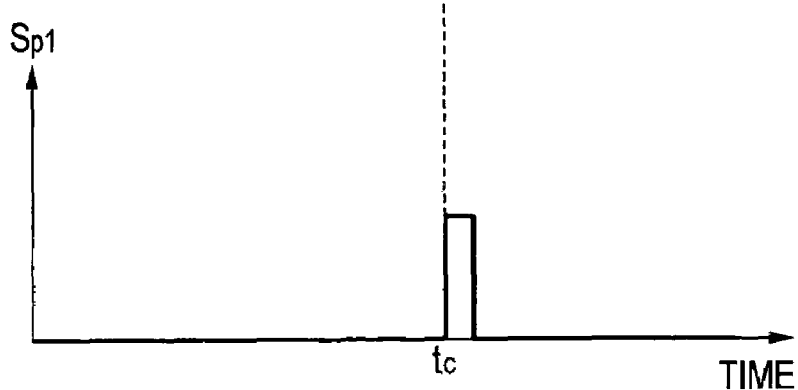

FIG. 11 is a graph showing an operation of the pulse detecting circuit 45 according to the variant. In FIG. 11, (a), (b) and (c) show a transition of the voltage Vcd on both ends of the capacitor 32, the voltage Vs from the differentiating circuit portion 45a, and the voltage from the Schmitt trigger 45c (the pulse applying signal $Sp_1$), respectively.

When the voltage Vcd on both ends of the capacitor 32 reaches a discharge starting voltage Vbk (a time $t_c$), a high voltage pulse is applied to the discharge lamp L, and at the same time, the voltage Vcd on both ends is decreased to the vicinity of 0V. At this time, since the voltage Vcd on both ends is decreased rapidly, the voltage $V_8$ from the differentiating circuit portion 45a has a negative pulse-shaped waveform with respect to the constant voltage Vcc shown in FIG. 11(b). The pulse waveform of the output voltage $V_8$ is reshaped and inverted by the clamp portion 45b and the Schmitt trigger 45c so that a rectangular pulse waveform shown in FIG. 11(c) is obtained. Accordingly, the voltage from the Schmitt trigger 45c (the pulse applying signal $Sp_1$) indicates the timing for applying the high voltage pulse depending on a rise thereof.

As in the variant, the pulse detecting circuit 45 provided in the lighting confirming portion may include the differentiating circuit portion 45a for differentiating the voltage Vcd on both ends to generate the pulse applying signal $Sp_1$ based on the voltage $V_8$ from the differentiating circuit portion 45a.

The discharge lamp lighting circuit according to the invention is not restricted to the illustrated embodiment; various deformations can be made. For example, although the control portion 10 according to the illustrated embodiment executes the lighting control again by superposing the lighting confirmation signal Sf on the voltage $V_1$ output from the calculating portion 11, for example, the calculating portion may receive the lighting confirmation signal from the lighting confirming portion to change the output voltage of the calculating portion in response to the lighting confirmation signal.

Other implementations are within the scope of the claims.

The invention claimed is:

1. A discharge lamp lighting circuit for supplying, to a discharge lamp, an AC power to turn ON the discharge lamp, comprising:
   power supplying circuitry having a series resonant circuit including a plurality of switching units, at least one of an inductor or a transformer, and a capacitor, and driving circuitry to drive the switching units and supply the AC power to the discharge lamp;
   starting circuitry to apply a high voltage pulse to the discharge lamp, thereby promoting lighting;
   lighting confirming circuitry to generate a lighting confirmation signal indicating that a lighting operation for the discharge lamp fails or is successful by the high voltage pulse; and
   control circuitry to control a driving frequency of the driving circuitry based on the lighting confirmation signal,
   wherein the lighting confirming circuitry is operable to generate the lighting confirmation signal based on a relationship of a magnitude between an interelectrode voltage of the discharge lamp or an equivalent voltage thereto and a first predetermined voltage at a time that a predetermined time passes after the high voltage pulse is applied to the discharge lamp and includes:

a comparing circuit to compare the interelectrode voltage or the equivalent voltage thereto with the first predetermined voltage;

a pulse detecting circuit to generate a pulse applying signal indicative of a timing for applying the high voltage pulse;

a delay circuit to delay the pulse applying signal by the predetermined time; and a signal generating circuit to check a signal from the comparing circuit in a timeframe indicated by the pulse applying signal which is delayed, and to generate the lighting confirmation signal as a signal indicating that the lighting operation for the discharge lamp fails when the interelectrode voltage or the equivalent voltage thereto is higher than the first predetermined voltage.

2. The discharge lamp lighting circuit according to claim 1, wherein the starting circuitry has a capacitive unit for storing power to generate the high voltage pulse, and wherein the pulse detecting circuit is operable to set, as a timeframe for applying the high voltage pulse, a timing in which a voltage on both ends of the capacitive unit exceeds a second predetermined voltage and then is decreased to be lower than the second predetermined voltage.

3. The discharge lamp lighting circuit according to claim 1, wherein the starting circuitry has a capacitive unit for storing power to generate the high voltage pulse, and wherein the pulse detecting circuit includes a differentiating circuit for differentiating a voltage on both ends of the capacitive unit, and is operable to generate the pulse applying signal based on a voltage from the differentiating circuit.

4. The discharge lamp lighting circuit according to claim 1, wherein the control circuitry is operable to cause the driving frequency to approximate a predetermined frequency which is higher than a frequency corresponding to a predetermined no-load output voltage when inputting the lighting confirmation signal indicating that the lighting operation for the discharge lamp fails from the lighting confirming circuitry, and is operable then to reduce the driving frequency so that the interelectrode voltage approximates the predetermined no-load output voltage.

5. The discharge lamp lighting circuit according to claim 2, wherein the control circuitry is operable to cause the driving frequency to approximate a predetermined frequency which is higher than a frequency corresponding to a predetermined no-load output voltage when inputting the lighting confirmation signal indicating that the lighting operation for the discharge lamp fails from the lighting confirming circuitry, and is operable then to reduce the driving frequency so that the interelectrode voltage approximates the predetermined no-load output voltage.

6. The discharge lamp lighting circuit according to claim 3, wherein the control circuitry is operable to cause the driving frequency to approximate a predetermined frequency which is higher than a frequency corresponding to a predetermined no-load output voltage when inputting the lighting confirmation signal indicating that the lighting operation for the discharge lamp fails from the lighting confirming circuitry, and is operable then to reduce the driving frequency so that the interelectrode voltage approximates the predetermined no-load output voltage.

7. A discharge lamp lighting circuit for supplying, to a discharge lamp, an AC power to turn ON the discharge lamp, comprising:

power supplying circuitry having a series resonant circuit including a plurality of switching units, at least one of an inductor or a transformer, and a capacitor, and driving circuitry to drive the switching units and supply the AC power to the discharge lamp;

starting circuitry to apply a high voltage pulse to the discharge lamp, thereby promoting lighting;

lighting confirming circuitry to generate a lighting confirmation signal indicating that a lighting operation for the discharge lamp fails or is successful by the high voltage pulse; and control circuitry to control a driving frequency of the driving circuitry based on the lighting confirmation signal, wherein the lighting confirming circuitry is operable to generate the lighting confirmation signal based on a relationship of a magnitude between an interelectrode voltage of the discharge lamp or an equivalent voltage thereto and a first predetermined voltage at a time that a predetermined time passes after the high voltage pulse is applied to the discharge lamp; and wherein the control circuitry is operable to cause the driving frequency to approximate a predetermined frequency which is higher than a frequency corresponding to a predetermined no-load output voltage when inputting the lighting confirmation signal indicating that the lighting operation for the discharge lamp fails from the lighting confirming circuitry, and is operable then to reduce the driving frequency so that the interelectrode voltage approximates the predetermined no-load output voltage.

\* \* \* \* \*